Sept. 11, 1934.  J. W. GALYON  1,972,984
RECORD CONTROLLED MACHINE
Filed April 29, 1932   5 Sheets-Sheet 1

INVENTOR
John W. Galyon
BY
ATTORNEY

Patented Sept. 11, 1934

1,972,984

UNITED STATES PATENT OFFICE

1,972,984

RECORD CONTROLLED MACHINE

John W. Galyon, Springfield, Ill., assignor, by mesne assignments, to International Business Machines Corporation, New York, N. Y., a corporation of New York Application April 29, 1932, Serial No. 608,188

4 Claims. (Cl. 235—92)

This invention relates to record-controlled machines employed in compiling accounting and statistical data.

Such machines usually are controlled by suitably perforated record cards wherein the perforations represent both numerical and classification data. Illustrations of the form which such a machine may take are described in detail in United States Letters Patent Nos. 1,762,145 and 1,757,123. The machines described in said patents operate according to the well known Hollerith system and are used very extensively for accounting and statistical purposes.

According to the usual practices in the art of compiling accounting and statistical data by means of perforated cards, the latter are perforated with the data on invoices, bills, notes, checks, schedules, memorandums or other papers and are then sorted in a sorting machine to place the record cards in some preconceived order which depends upon the nature of the accounting and statistical data desired. As a general rule the cards are arranged in groups according to classification or code numbers punched therein and are then fed into the tabulating machine which accumulates totals of each class and may or may not print the items and totals. The tabulating machine is usually provided with what is now known in the art as an "automatic group control unit" which is designed to sense changes in the group numbers and cause the machine to automatically take a total of the items accumulated by the group of item cards which passed through the machine prior to the initiation of the total taking cycle. If desired, the machine may be set by suitable control means, such as a switch, so that the feeding and accumulating of the item cards automatically ceases after a group of cards has been accumulated and the machine stops, permitting the operator to visually read the total and copy it himself or manually initiate the total taking cycle by suitable control means as, for example, a total key.

It is often desired to secure a total of the items on all cards bearing a certain classification or code number without the necessity of pre-sorting the cards to eliminate all but the desired cards so that the latter occur in a single group. This situation often arises where the record cards are always filed according to a given classification system and for convenience of reference must always be re-filed in accordance with such system, requiring that the cards be first sorted into groups according to a different classification and then, after the tabulation of the individual cards in the desired group or groups has been completed, re-sorted to restore the cards to their original order in the files. Where the number of cards is large such sorting operations necessary to eliminate all but a certain class or group for the purpose of tabulating a single group classified differently from the file classification is often time consuming and wasteful. This is particularly true where the new classification may form a new grouping wherein the cards to be tabulated as a single group includes a major share of the total number of cards.

Even if it should be found economical to pre-sort the cards to obtain a group having only those cards which are to be tabulated, and, after the tabulation is complete, to re-sort the cards into their original orders, it may happen that no sorting machine is available for use due to accumulation of work to be sorted, breakdowns, or the like, and it is found necessary to tabulate the cards without a preliminary sorting operation on the machine.

Another situation sometimes is found where the cards as filed are classified into major classification groups and minor classification groups and it is desired to tabulate the cards of a certain minor group without destroying the order of the cards and at the same time secure separate totals of specified cards in each major group. In other words, a grand total is desired of all cards of a certain minor classification and subtotals of specified cards of a minor group occurring in each of the major classification groups.

Each of the various situations and circumstances outlined above may be illustrated by reference to a given problem which is often found in practice. It will be assumed that a given manufacturer of goods has regular representatives or sales offices in several States or other geographical sub-divisions and that a number of different styles or types of machines or classes of goods are manufactured and sold through these representatives or sales offices.

Every time a sale is made or a machine shipped on order a card is perforated with the data as to representative or sales office, kind or style of machine, amount of sale, and so on, and the cards are filed in major groups by sales offices or representatives and in minor groups by style of machine or class of goods, this having been found by experience to be a very convenient and satisfactory arrangement of the card files.

At the end of a given period, say a year, it may be necessary to prepare a report showing the sales record of each sales office or representative for said period with regard to a single model, style of machine, or class of goods. At present, in order to secure such a report, it would be necessary to sort out from the batch of records representing the sales of all styles and types of machine sold all those cards related to the particular style or model for which a sales report is desired and then pass the cards through the tabulating machine. After the tabulation is complete, the cards must be re-sorted to get them back into their proper places among the other cards in the files which of course necessitates two sorting operations and one tabulating operation to secure the desired report. If the report deals with a popular product which is the one having the greatest number of sales compared to the other products, the great majority of the cards will deal with this product alone and the cards which are not to be tabulated will be a minority. The minority may be so small that, if means could be provided to cause the tabulating machine to pass these cards on without tabulating the data thereon, a considerable amount of time and labor could be saved which more than offsets the waste in time caused by the idle cycles in the tabulating operation as a consequence of the passage of the undesired cards through the machine along with the desired cards.

It may be desired to secure a tabulation not merely showing the total sales of the given product or machine but it is also desired to show on the same report separate sub-totals of the sales of each representative or sales office with reference to the same product or machine. This report requires two preliminary sorting operations, one to sort the cards into major groups according to the sales office or representative, the other to sort the major groups into minor groups according to the product sold.

The cards can then be passed through the tabulating machine and through the instrumentality of the automatic group control unit, a total will be secured of each group of cards relating to a sales office or representative and also a grand total of all sales of the given product will be secured.

The process of preparing the reports according to various classifications of the cards thus involves a great many sorting operations prior to and after each tabulating operation, and much of the time required for some of these sorting operations would be saved if the tabulating machine were so equipped as to permit passing all the cards through the machine without however effecting tabulation of the undesired cards, particularly where the number of cards to be tabulated for a given report constitutes a majority of the total number passed through the machine.

The present invention has for its object to provide accounting and statistical machines controlled by perforated records with means for suppressing the accumulation of all record cards except cards of a predetermined classification or vice versa.

More specifically the object of the invention is to improve the automatic group control unit by providing means coordinated with said unit for securing greater flexibility of operation and greater adaptability to problems other than merely controlling the initiation of total taking operations or stopping the machine at the end of each group of cards fed through the machine.

A specific object is to provide the automatic control unit with mechanism adapted to be set up according to a predetermined classification or code number comprising several digits which mechanism may become effective, on the passage of a card having perforations representing the predetermined code number, to cause the machine to either accumulate the data in said card or suppress accumulation according to the result desired.

Another specific object is to co-ordinate selector mechanism with automatic group control mechanism whereby to permit tabulating only certain cards in a number of successive groups of records with the totals of such cards occurring after each group and intermediate of the groups on the work sheet receiving the entries from the individual cards.

Another object is to generally improve the operation of record-card-controlled accounting and statistical machines in general by providing mechanism for increasing their flexibility of operation and adaptability.

Other objects, advantages, or features of the invention will be pointed out in the following description and claims or will be apparent after a study of said description, claims, and the accompanying drawings.

The present invention will be described as embodied in a machine of the type illustrated and described in the above mentioned Letters Patent with particular reference to No. 1,762,145. However, it should be noted here that the invention is not limited to embodiment in the specific machine illustrated and described in said patent but may be embodied in other machines equally as well. The general details of construction of the machine are now well known in the art and described in said patent, consequently there will be given herein only a brief general explanation of such parts thereof as are necessary to an understanding of the present invention. For a more detailed description reference may be had to the patent. It will be understood that similar parts will be indicated by identical reference characters in describing both forms of the invention and only those parts which are different in function or construction will be identified by different reference characters.

Certain cam operated contacts described in Patent No. 1,762,145 will be referred to herein from time to time and such contacts will be identified herein by letters and numerals to correspond with the reference characters designating similar cam contacts in the patent. It will be very helpful in understanding the invention described herein if it be noted that cam contacts identified by the letters C, L, and T are operated by the tabulating mechanism through the power of the motor TM, while cam contacts identified by the letters P and LP are operated by the resetting and total taking mechanism through the power of the motor RM.

The machine is driven by a tabulating motor TM mounted on the frame 10 of the machine (Figs. 1 and 5a) and arranged to drive the various tabulating shafts through a belt 11 and a clutch 12 (Fig. 5a) of the one-revolution type so arranged that interruption of current to the motor causes the machine to stop in a definite position. The clutch 12 is operatively engaged by means of a magnet 13 in series with the motor. The latter is of the two-speed type described in Patent No. 1,762,145 and may be started manually by depressing a key ST as described in said patent which causes said clutch magnet to be energized to operatively couple the motor to the principal drive shaft of the tabulating mechanism. The operating circuit for the motor TM is maintained through relay contacts MCC which are closed by a relay magnet MC hereinafter to be termed the motor control relay. Before starting the motor TM to commence tabulation of cards it is necessary to close contacts MCC by initiating a total taking and resetting cycle.

The total taking and resetting mechanism (hereinafter called the total taking mechanism) is driven by a motor RM adapted to be operatively connected to said mechanism by one-revolution clutch mechanism controlled by a clutch magnet 14 in series with said motor, contacts 15, starting key RS, and contacts L—2 across the current supply line wires 16, 17. Contacts L—2 are closed when the tabulating mechanism is in its normal stopping position but are opened as soon as the tabulating motor TM begins to drive the tabulating mechanism and remain open until just before the end of each card cycle. The contacts 15 remain open as long as the clutch magnet 13 is energized. Thus, it is impossible to start the motor RM by means of key RS or the automatic starting circuit until the motor TM stops or is about to stop.

The automatic starting circuit for the motor RM extends through contacts 15, cam contacts L—1, a switch 18, and the stop key SP for the motor TM. When the switch 18 is closed the motor RM will automatically start due to closure of contacts L—1 at the end of the cycle in which the last card of a group or batch of cards is tabulated, this event taking place after the clutch magnet 13 has become deenergized by interruption of the current to the motor TM.

Before the motor TM can be started to begin a series of tabulations, the total taking mechanism must be operated to erase any totals standing on the accumulating mechanism. Depression of key RS causes the motor RM to start by setting up a circuit from line wire 16 through the motor RM, clutch magnet 14, contacts 15, key RS, and cam contacts L—2 to line wire 17. Energization of magnet 14 causes contacts 19, operated by a part of the clutch for the motor RM, to close thereby setting up a holding circuit around the key RS to permit the latter to be released, cam contacts P—1 closing shortly thereafter to maintain another holding circuit until, near the end of the total taking and resetting cycle, cam contacts P—1 reopen to stop the motor RM. Closure of cam contacts P—1 shunts the clutch magnet 14, deenergizing the latter and causing contacts 15 to open in readiness for subsequent stoppage of motor RM when contacts P—1 reopen about the end of the total taking and resetting cycle.

Early in the total taking and resetting cycle upper and lower cam contacts P—3 open and close, respectively, thereby preventing the motor TM from being re-started and at the same time setting up a holding circuit for the magnet MC of the motor control relay through a holding relay 20, the holding circuit extending from line wires 16, magnet MC, relay 20 and its contacts 20a, cam contacts C—1 (if the automatic group control is to function, otherwise the circuit goes through a switch 21, closed) to the line wire 17.

If a switch 22 is closed and a card is under the lower brushes, the motor TM will start automatically at the end of the resetting cycle when upper contacts P—3 reclose, the restarting being effected over a circuit extending through said motor from line wire 16, the clutch magnet 13, motor relay 23, switch 22, cam contacts P—4 (closed for a brief period just before the resetting cycle comes to an end), lower card lever contacts LCL, cam contacts C—3, contacts MCC, key SP, and contacts P—3, to line wire 17.

When no card happens to be under the lower brushes the contacts LCL will be open and the motor TM must be started manually by depressing key ST which key bridges the contacts 24 of the motor relay 23 and the upper card lever contacts UCL. Depression of key ST initiates one tabulating card cycle during which a card will be advanced from the card magazine and fed into position to be sensed by the upper brushes thereby causing the upper card lever contacts UCL to close. The motor TM will stop at the end of this cycle because the contacts LCL are still open and cause the automatic group control to function in the usual manner to brake the circuit through relay MC. If switch 18 is closed, an automatic reset cycle will take place during which the relay MC will be again set up. The start key ST must now be depressed to restart the motor TM for a second card cycle. During the second card cycle, the first card will be fed down to the lower brushes and the second card will be fed from the magazine to the upper brushes. The lower card lever contacts LCL will close near the end of the second card cycle which will come to an end when the upper and lower brushes rest in positions midway between the leading edges of the cards and the "9" index-point positions in said cards. The motor TM will stop after this second cycle also because the automatic control will again function to deenergize relay MC. An automatic reset cycle follows the second card cycle to again set up the circuit for relay MC at the end of which reset cycle the motor TM will be automatically restarted since contacts LCL are now closed. During the card cycle which follows a reading will be taken from the first card, the group number will be printed, and data identified thereby will be accumulated in the usual manner. The motor TM will now continue in operation until the key SP is depressed, the group number changes, or the card magazine becomes empty.

The cards are advanced one by one from a stack 25 (Fig. 5a) by means of a picker 26 operated once per card cycle and are caught between feed rollers 27 by means of which the cards are fed past upper brushes UB and lower brushes LB into a suitable receiving hopper. The upper brushes have a common connection through a bar and cam contacts T—S to the line wire 16 and cooperate with suitable contact blocks 28 to which are connected the individual wires of a cable 29 leading to the plugboard where each terminates in a plug socket 30. The latter may be numbered on the plugboard to correspond with the columns read by the associated upper brushes UB.

Figure 5A:
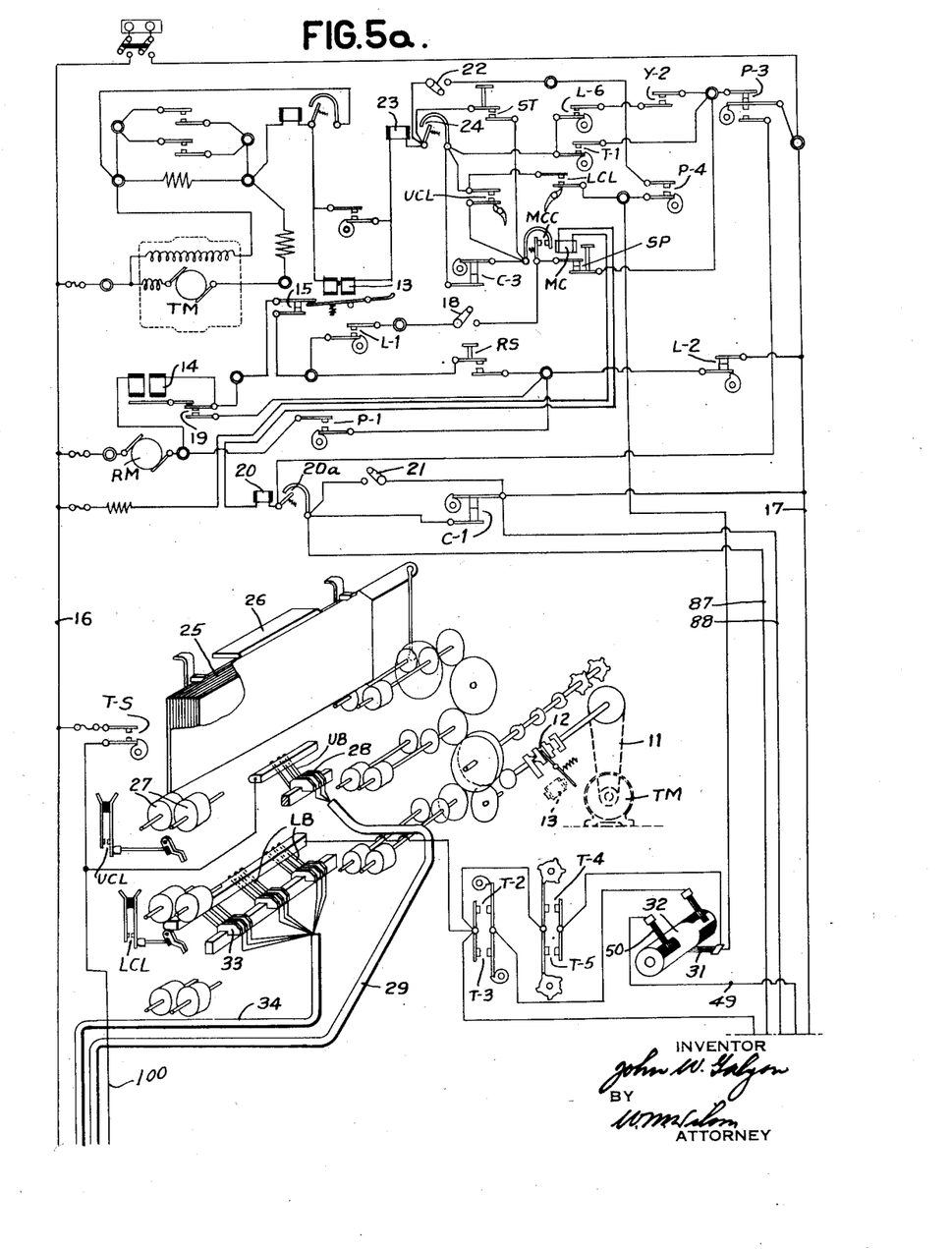
Figs. 5a and 5b together form a circuit diagram of one form which the invention may take.

The lower brushes LB are connected in common to a wire leading to a series of cam contacts T—2, T—3, T—4, T—5 which latter two contacts have a connection to a brush 31 bearing on the central part of a list-non-list commutator 32. The central brush 31 of said commutator is also connected to the wire between contacts LCL and P—4. The list-non-list commutator is fully described in Patent No. 1,762,145, and, as it is not directly involved herein, it will not be described in detail. It will suffice to say that its purpose is to control the printing of the group number from the first card of a group when the machine is conditioned for tabulating without listing. The cam contacts T—2, T—3 cooperate to close the circuit to brushes LB just before the "9" index-point position and break said circuit just beyond the "0" index-point position, that is, said contacts permit current to flow through the lower brushes only during the adding portion of each card cycle.

The cam contacts T—4, T—5 permit current to flow in the circuits through the upper brushes UB only when the said brushes are actually in the perforation in the cards and are provided to prevent arcing at the lower brushes when the extra printing banks are being used to print group numbers or other data. These contacts are operated by star cams and are now a common feature of machines of the Hollerith type.

Each lower brush LB like the brushes UB, has a coacting contact block 33 to which is connected one of the wires of a cable 34 leading to the plugboard where each wire of the cable is connected to a triple plug socket 35. By means of these plug sockets 35 plug wires may connect one or more of the accumulators and listing banks to the lower brushes while the automatic control unit is plugged between the plugs 30, 35 corresponding to the columns in which the group numbers appear in the cards.

Figure 1:
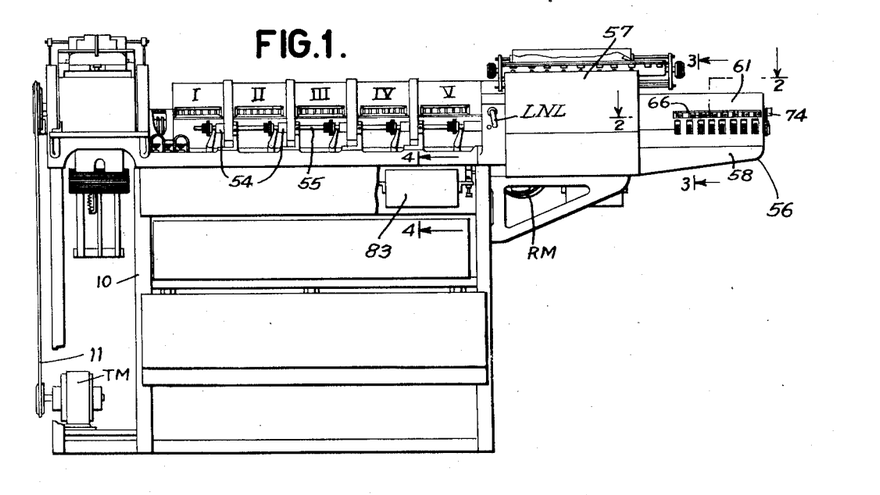
Fig. 1 is a front elevation of a machine embodying the present invention and shows the invention attached to said machine.
Figure 5B:
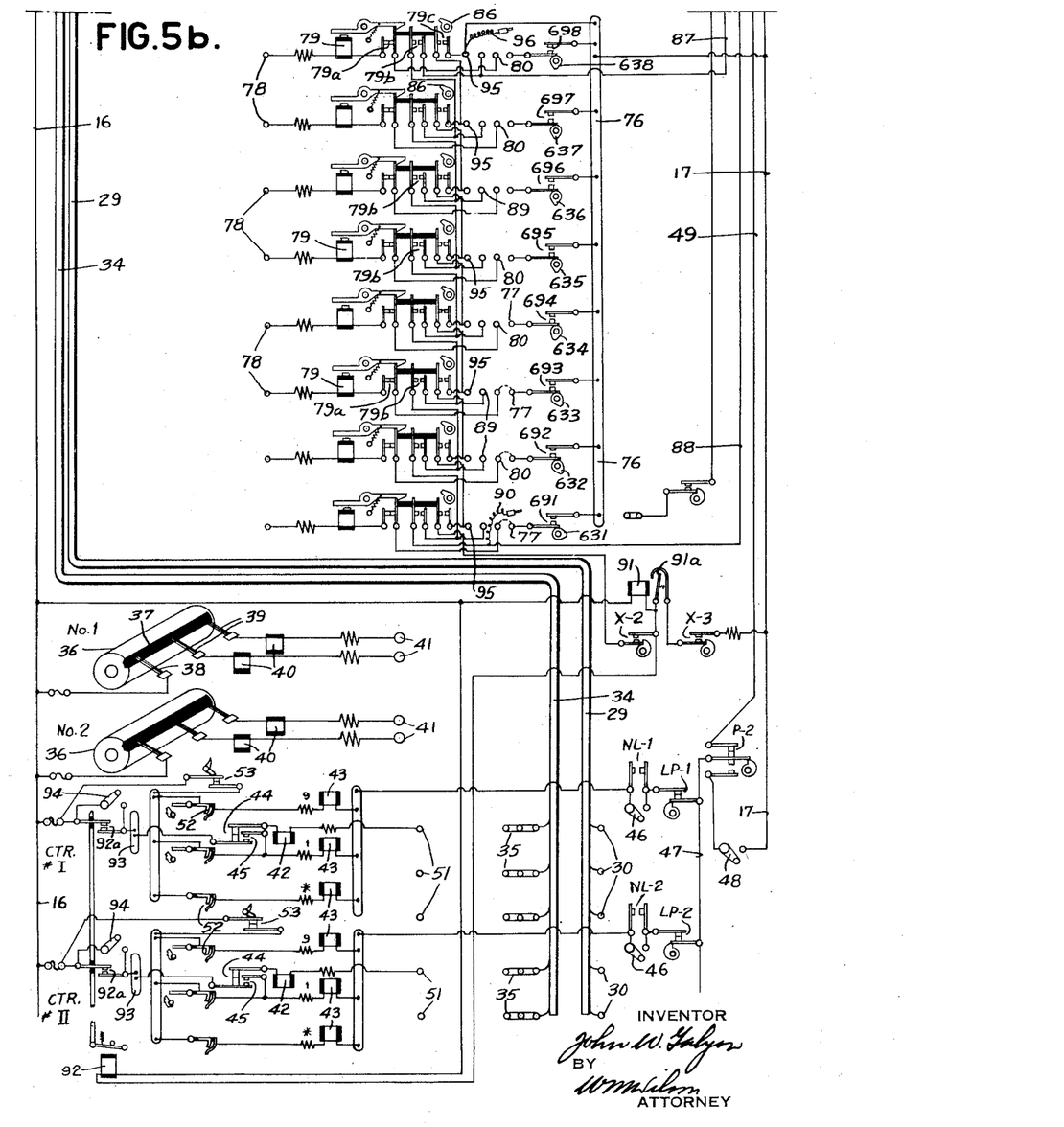

The machine illustrated in Patent No. 1,762,145 is provided with five accumulator sections or "counters" designated I to V, inclusive, in Fig. 1. Associated with each counter is a printing bank. In order to save space only two counters are shown in Fig. 5b, designated CTR#I and CTR#II, respectively, and only three typical circuits for each counter and its associated printing bank have been shown; namely, the asterisk printing circuit, identified by an asterisk, the circuit for the units order, identified by a small numeral "1" and the highest or 100 millions order, identified by a small numeral "9". There are two additional printing banks, not associated with any counter, which are used for listing data which is not to be accumulated but merely printed, such as dates, group numbers, and so on. The actual number of printing banks and counters which may be incorporated in any given machine and their arrangement is arbitrary so far as the present invention is concerned. Since the counters and printing banks are described briefly in the patents above cited and in detail in Patent No. 1,379,268 only a brief description will be given herein.

The two additional printing banks are designated No. 1 and No. 2, respectively (Fig. 5b), and each comprises a commutator 36 having an insulating segment 37 upon which bear a common brush 38 and brushes 39 connected to individual printing magnets 40. The commutators 32, 36 are preferably mounted on the same shaft as described in Patent No. 1,762,145.

Each printing magnet is in turn connected to a plug socket 41 on the plugboard by means of which socket the printing banks may be plugged to the sockets 35 for the purpose of printing group numbers as described in Patent No. 1,762,145. The commutator 36 makes one revolution per card cycle when it is desired to list items on the individual cards and also makes one revolution to print the group number from the first card of a group when the machine is tabulating without listing. It will be understood that several listing circuits are provided in each printing bank in addition to the two shown in the banks illustrated in Figs. 5b and 5c in order to give each bank ample capacity to print group numbers of several digits.

The counters are designated CTR#I and CTR#II, respectively, as stated, and each comprises several counter clutch magnets 42 associated with which is a listing magnet 43 and contacts 44, 45 mechanically operated by a clutch member when the magnet 42 becomes energized whereby to cause contacts 44 to open and contacts 45 to close. The magnets 42 control the coupling of the associated accumulator wheels to a common drive shaft in the machine at the time when the lower brushes sense perforations in a card under said brushes so that the amount represented by the perforations will be accumulated in the usual fashion as described in Patent No. 1,534,532. The contacts 44 are provided for the purpose of breaking arcs in the counter rather than at the lower brushes LB.

The magnets 43 are energized by closure of contacts 45 to control the setting of the type bars in a well known manner. Both groups of magnets 43 have common connections through bus bars individual to each section, non-list switches 46, non-list contacts NL—1, NL—2 and cam contacts LP—1, LP—2, to a bus wire 47.

The latter is connected to the central member of cam contacts P—2, the upper of which are held closed during tabulating operations and open during totaling operations. The reverse operation is true of the lower contacts P—2 which are connected to the right line wire 17 through a non-total switch 48. The upper contacts P—2 are connected to a wire 49 leading to a brush 50 cooperating with the commutator 32 which brush bears on the insulating portion of the commutator when the tabulating mechanism is in its stopping position.

Each magnet 42 in the accumulator sections is connected to a plug socket 51 which may be connected by plug wires to any of the sockets 35 to permit the counter magnets to operate under control of perforations in any group of columns in the cards. The usual total reading contacts 52 are provided and have a common connection to the wire 16 through a bus bar in each accumulator section and contacts 53 operated by the resetting clutches 54 (Fig. 1) individual to each counter. The contacts 53 are closed when the associated clutch 54 is manually shifted to operatively connect the shaft carrying the related group of accumulator wheels of a counter to the common resetting shaft 55 for the purpose of resetting said counter to zero and print the total standing on said wheels.

The contacts NL—1, NL—2 are closed early in the resetting cycle to permit printing of accumulated totals of items the printing of which is suppressed by said contacts when the machine is operating without listing. These contacts are always open when the total taking mechanism is in its normal stopping position so that items entered in the accumulators are not printed. The switches 46 are closed when the machine is listing items to permit printing of the items entered in certain accumulators. The cam contacts LP—1, LP—2 open at the end of the period during the total taking cycle in which the total is being read and reclose toward the end of said cycle. Their purpose is to break the circuits through the listing magnets 43 immediately after the total has been read and printed.

The lower cam contacts P—2 close early in the total taking cycle and reopen toward the end thereof to provide a path for current to flow through the total reading contacts 52 and listing magnets 43 to the line wire 17, by way of the non-total switch 48, as the brush 50 bears on the insulating part of the commutator 32 when the tabulating mechanism is in its normal stopping position. The mechanism and circuits so far described are old and now well known in the art and have been embodied in various forms or combinations in numerous machines in everyday use.

The present invention contemplates modifying the automatic group control unit usually embodied in machines of the type briefly described herein and illustrated and described in detail in the cited patents by coordinating with said group control unit mechanism for causing only predetermined items or classes of items to be entered in the accumulators or vice versa. The manner in which the foregoing result is obtained is by co-ordinating with the group control unit a settable selector device which is adapted to be set up according to a predetermined classification or group number.

Figure 2:
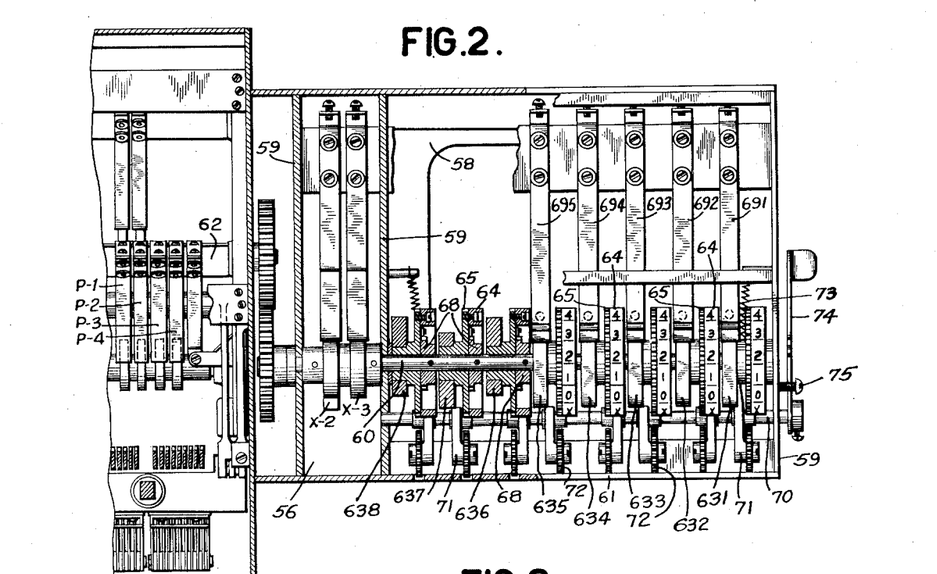
Fig. 2 is a horizontal section taken substantially on the line 2—2 in Fig. 1.
Figure 3:
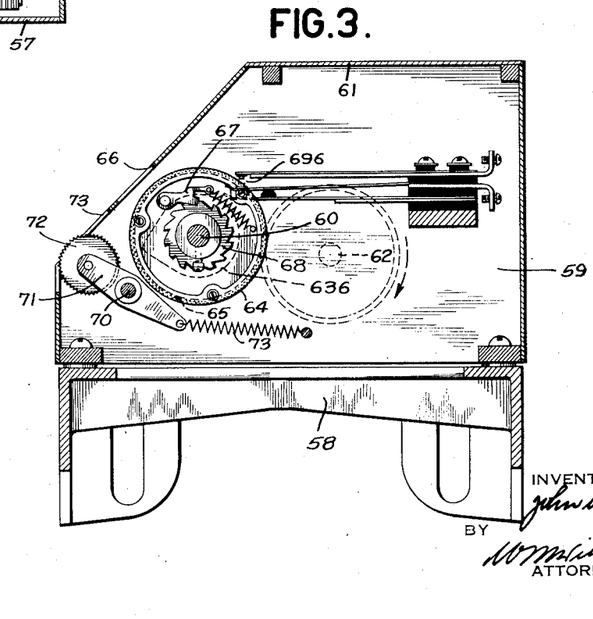
Fig. 3 is a vertical section on the line 3—3 in Fig. 1.

The selector device is designated generally by the reference numeral 56 in Fig. 1 and is secured to the right side of the printer unit 57 by a suitable bracket or frame 58. It comprises frame plates 59 (Figs. 2 and 3) mounted in spaced relation on the bracket 58 and supporting a shaft 60 journalled in said plates. A casing 61 supported by the plates 59 encloses the mechanism and keeps out dust.

The shaft 60 is geared to a shaft 62 which is driven at the rate of one revolution per card cycle by the motor TM, the gearing being such that shaft 60 also makes one revolution per card cycle.

Loosely mounted on shaft 60 is a series of eight selector cams 631 to 638, inclusive, affixed to which are the indicating wheels 64 and gears 65, respectively. The casing 61 is provided with an opening 66 through which the figures on the wheels 64 can be viewed. Each wheel 64 is hollow and inside of each, pivoted to the associated gear 65, is a spring pressed pawl 67 cooperating with the teeth in a ratchet 68 secured to the shaft 60. The arrangement is such that rotation of shaft 62 in the direction of the arrow (Fig. 3) causes the shaft 60 and the ratchets 68 secured therein to be driven in a counterclockwise direction with the consequence that cams 631 to 638 and wheels 64 will always be positively driven.

Adjacent each cam 631 to 638, inclusive, is a pair of contacts 691 to 698, inclusive, which contacts are normally open but each pair is adapted to be closed by the related cam at a point in the card cycle dependent upon the displacement of the cam about the shaft 60. A shaft 70 loosely mounted in the frame plates 59 has fixed thereto a series of arms 71 upon the ends of which are loosely journalled a series of setting gears 72 projecting through slots 73 in the casing 61. The right hand arm 71 (Fig. 2) projects downwardly and is connected to a spring 73 anchored to a stud carried by one of the frame plates 59. Externally of the casing 61 the shaft 70 has fixed thereto a hand lever 74 normally held by the spring 73 against a stop 75 fixed to the right frame 59 (Fig. 2), whereby gears 72 and 65 may be enmeshed for manual operation as explained hereinafter. Two special cams X—2, X—3 are fixed to the shaft 60 and operate contacts similar in general to the contacts 691 to 698.

The provision of eight wheels 64 and their associated cams designated 631 to 638, gives the machine ample capacity to select items identified by group numbers up to eight digits. Obviously, the actual number of wheels 64 provided in any given machine is arbitrary or determined by service requirements as to capacity for selection of items.

Each indicator wheel 64 is marked on its periphery with numerals designating the twelve index-point positions on the record card, that is, "9", "8", "7"... "0", "11", "12" and so disposed that when any wheel is turned manually to bring a number designating an index-point position into view through the opening 66, the associated cam will be effective to close its contacts at the corresponding point in the cycle. If, for instance, the wheel associated with cam 631 were turned to bring the "9" thereon into view, the cam 631 would be effective to close contacts 691 when the upper brushes are reading the "9" index-point positions in a card thereunder. In order to turn any of the wheels 64 manually the lever 74 is pressed down and the gears 72 associated with the selected wheels 64 turned with the fingers in a direction to rotate the associated wheels 64 counterclockwise (Fig. 3) until the desired numerals appear through the opening 66.

The cam contacts 691 to 698 are connected in common to the right line wire 17 through a bus bar 76 (Fig. 5b) and singly to plug sockets 77 on the plugboard. The plug sockets 77 are included in the automatic group control unit which will now be described.

There are eight automatic group control circuits illustrated in Fig. 5b, each extending from a plug socket 78, through a group control magnet 79 and contacts 79a to a plug socket 80. Also associated with each magnet 79 are contacts 79b and 79c which are closed whenever the magnet 79 is energized while the contacts 79a are opened by such operation.

Figure 4:
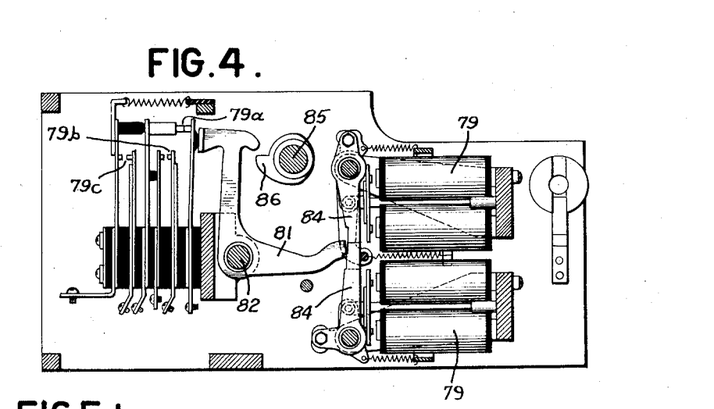
Fig. 4 is a vertical section on the line 4—4 in Fig. 1 showing the construction of certain parts of the automatic group control mechanism and selector mechanism.

The mechanical construction of these contacts is shown in Fig. 4. Each group of contacts 79a, 79b, 79c is operated by a bell crank 81 loosely mounted on a shaft 82 carried in a box 83 (Fig. 1) removably secured to the frame 10 of the machine. Each bell crank 81 is normally held in the position shown in Fig. 4 by a spring operated pivoted latch 84 carrying an armature coacting with the poles of one of the magnets 79. The structure shown in Fig. 4 is identical with that shown in Fig. 25 of Patent No. 1,822,594 save for the addition of contacts 79c, and is well known in the art, having been used for quite a number of years. For this reason only a very brief description need be given herein.

The springs connected to the latches 84 normally hold the ends of the latches under the right ends of bell cranks 81. A shaft 85 has fixed thereto a series of cams 86, one for each bell crank 81, which cams rotate in a counter-clockwise direction (Fig. 4) and cooperate with said bell cranks to positively restore the latter to the position shown in Fig. 4 after any of the magnets 79 have been previously energized to release said bell cranks.

The shaft 85 is so geared to one of the main shafts of the tabulating mechanism that said shaft makes one revolution per card cycle and the cams 86 are timed to restore the contacts 79a, 79b, 79c to the position shown in Fig. 4 toward the end of each card cycle.

The contacts 79b are the usual series contacts of the group control unit and are all connected in series to wires 87, 88 connected in shunt with the cam contacts C—1. A plug socket 89 is connected to each series connection between contacts 79b, and a plug wire 90 is provided for the purpose of shunting as many of said contacts as may be necessary. The contacts 79c are similarly connected in series in a circuit extending from line 17 and the bus bar 76, through said contacts, cam contacts X—2 and a relay 91 to the left line wire 16. A multi-contact relay 92 in parallel with relay 91, has its several pairs of contacts 92a connected to the left wire 16 and to bus bars 93 serving as a common connection to the contacts 44, 45, respectively. The contacts 91a of relay 91 set up a holding circuit for the latter and relay 92 through cam contacts X—3 which holding circuit may extend from left line wire 16, relays 91, 92, contacts 91a, and cam contacts X—3 to the right line wire 17. A switch 94, connected across each pair of contacts 92a, provides means for disabling all or a part of the selector device when desired. The contacts 79c are provided with plug sockets 95 similar to the plug sockets 89 and a plug wire 96 is similarly arranged to permit shunting out of circuit as many of said contacts as may be necessary.

The operation of the mechanism just described will now be given in detail by reference to an illustrative batch of cards like the following, for example:

*Example I—Cards fed through machine*

| | | |
|---|---|---|
| 1101 | 651 | 97.65 |
| 1101 | 651 | 100.42 |
| 1101 | 662 | 99.37 |
| 1101 | 723 | 200.54 |
| 1102 | 651 | 98.43 |
| 1102 | 651 | 75.46 |
| 1102 | 651 | 1002.98 |
| 1102 | 680 | 997.83 |
| 1103 | 681 | 45.92 |
| 1104 | 706 | 30.50 |
| 1105 | 651 | 3000.41 |
| 1106 | 651 | 40.50 |
| 1106 | 651 | 97.50 |
| 1108 | 667 | 98.60 |
| 1109 | 650 | 100.32 |

It will be understood that the machine is to be operated without listing; that is, tabulating only, and that it is desired to not only secure a grand total of all items bearing the classification number 651 in column 2 above, but also individual totals of the cards designated 651 in each major group of cards indicated in column 1.

Preliminary to beginning the tabulation of the cards, the machine is set up as follows: The list non-list lever LNL (Fig. 1) is thrown to the right to non-listing position in order to suppress the printing of items on the cards with the exception of the group numbers which will be printed from the first card of each group. The list non-list lever will not be described herein as its construction, functions and operation are fully described in Patent 1,762,145, mentioned before herein.

It will be assumed that printing bank No. 1 is to be used to print the group numbers appearing in the first two columns of the above example. The items appearing in the third column are not to be printed but are to be accumulated on the accumulator wheels associated with counters Nos. 1 and 2. Accordingly, the non-list switches 46 associated with both counters mentioned will be placed in open position. The total switch 48 will be closed and the switch 21 controlling the automatic group control unit will be left in the open position.

The indicator wheels 64 associated with the cams 631 to 633 inclusive, in the selector device 56 (Figs. 1 and 2) will be set manually by depressing the lever 74 and turning the wheels 631 to 633 until the figures 1, 5, and 6 appear on the corresponding wheels 64 through the opening 66 in the casing 61, indicating that all cards bearing the minor classification number 651 are to be tabulated while all data on other cards is to be suppressed.

The plug wire 90 will be placed in the fifth socket 89 from the top (Fig. 5b) in order to shunt out the lower four series contacts 79b so that only the upper four magnets 79 will be effective to cause automatic total taking at the end of a major group. Since there are only four digits in the major group number, only four of the magnets 79 need be plugged to the upper and lower brushes. Since there are only three digits in the minor group number, the plug wire 96 will be placed in the third socket 95 from the bottom (Fig. 5b) so that only the lower three contacts 79c will be effective, the others being thereby shunted out of circuit. Plug wires will be inserted between the lower three plug sockets 80 and 77, respectively, as indicated by dotted lines in Fig. 5b. The lower three plug sockets 78 (Fig. 5b) will be connected by plug wires to the plug sockets 30 corresponding to the upper brushes which sense the columns of the cards in which the perforations representing the minor group number 651 appear. The switches 94 shunting the contacts 92a of each counter will be placed in their open positions.

The upper four plug sockets 78 will be connected by means of plug wires to the four sockets 35 which correspond to the lower brushes sensing the major group number appearing in column 1 of the illustrative series of cards given above, while the upper four plug sockets 80 will be similarly connected to the plug sockets 30 corresponding to the upper brushes reading the major group number. The clutch 54 (Fig. 1) associated with counter No. I (Fig. 5b) will be operatively engaged so that this counter will be reset to zero and the total thereon printed after each major group change, the shifting of the clutch 54 effecting closure of the contacts 53 in counter No. I to permit said totals to be printed while the clutch 54 associated with the counter No. II will be left in disengaged position so that amounts will be accumulated in said counter but the totals thereof will not be printed nor will the counter be reset to zero.

The plug sockets 35 corresponding to the lower brushes reading the items in the third column of the above example will be plugged to the appropriate orders of both counters Nos. I and II through the medium of the plug sockets 51 so that items read by the lower brushes will be entered into both counters through the plug wires. The plug sockets 35 corresponding to the lower brushes reading the group numbers will be plugged to the proper orders of printing bank No. 1.

The machine is started as above described by first performing a resetting operation through the depression of key RS to start the resetting motor RM. During the ensuing total taking and resetting cycle the motor control relay MC and its holding relay 20 will be set up as described, thereby permitting the tabulating motor to be manually started by depression of the key ST. As a consequence, the first card will be fed under the upper brushes and as it is traversed by said brushes, those brushes reading the holes representing minor group number 651 will sense said holes at the times when the cams 631, 632, and 633 are closing their associated contacts 691 to 693, respectively.

In other words, when a brush reads the "6" hole of the group number "651" cam contact 693 will be closed at the same time thereby permitting a circuit to be established from the line wire 16, cam contacts T—S, through the upper brush sensing the hole in the "6" position of the first card, the appropriate wire in cable 29, plug socket 30, the plug wire to the third plug socket 79 from the bottom (Fig. 5b), the group control magnet 79, contacts 79a associated therewith, the plug wire joining plug sockets 77 and 80 and the cam contacts 693, to the right line wire 16. This will cause the third magnet 79 from the bottom (Fig. 5b) to attract its armature thereby causing the associated contacts 79b and 79c to close, the contacts 79a immediately breaking the circuit through the magnet 79 and preventing arcing at the upper brush reading the "6" hole. Similarly, circuits will be established through the lower two magnets 79 at the instant when the upper brushes sense the holes representing "5" and "1", respectively.

As a result of the foregoing events the lower three contacts 79c, corresponding to the three columns in which the minor group number 651 appears in the cards, will be closed and will permit a series circuit to be established through said contacts. After the upper brushes have read all the index-point positions in the first card, the cam contacts X—2 will close thereby permitting a circuit to be established from the left side of line 16, through the relays 91 and 92, cam contacts X—2, the lower three contacts 79c in series, and the plug wire 96, to the right line wire 17. Immediately thereafter, before the contacts X—2 reopen, the contacts X—3 will close and will remain closed throughout the remainder of the cycle in which the first card is passing the upper brushes. The relay contacts 92a will remain open from a point just after the completion of the reading of the first card by the upper brushes to a corresponding point in the reading of the second card by the upper brushes due to the fact that cam X—3 is timed to hold the circuit for such period.

Current is supplied to the counters over a circuit which extends from the line wire 17, upper cam contacts P—3, closed, cam contacts T—1, the lower card lever contacts LCL, to the central brush 31 of commutator 32 and thence through the commutator, cam contacts T—2, T—3 or T—4, T—5, the lower brushes and the cable 34 to the plug sockets 35. From the plug sockets 35 the current divides and passes through the appropriate plug wires to the sockets 51 and thence through counters Nos. I and II. It will be obvious therefore that the first card will be tabulated when it passes the lower brushes since the contacts 92a will be closed. This is due to the fact that the contacts 92a are kept closed by relay 92 during most of the time the second card is passing the upper brushes during which period the data in the first card will be read by the lower brushes.

At the same time, circuits will be established from the plug sockets 35, corresponding to the brushes reading the group numbers, to the plug sockets 41 of printing bank No. 1 and thence through the printing magnets 40 and commutator 36 of said bank to the line wire 16.

During the cycle in which the first card is passing beneath the lower brushes the commutator 32 will turn one revolution as described in Patent No. 1,762,145 permitting the printing of both the major and minor group number from printing bank No. 1 but, due to the fact that the list ncn-list lever LNL is in the non-listing position, the commutator 32 will cease to turn after said cycle thereby preventing further printing operations under control of the cards until after a change of group has been effected causing the printing of a total automatically.

After the first card has been tabulated, the remaining cards of major group 1101 which bear the minor classification number 651 will be likewise tabulated. However, when the cards designated 662 and 723, respectively, in the minor group designating columns of the cards are sensed by the upper brushes, some of the contacts 691 to 693 will close at times which will not be coincident with the reading of the holes designating the minor group number; consequently, at least one of the lower three magnets 79 will not be energized and an open circuit will exist due to the failure of at least one pair of the contacts 79c to close. It is clear, therefore, during those particular cycles, the closing of the cam contacts X—2 will not cause the relays 91, 92 to be set up as previously described; consequently, contacts 92a remain open to prevent energization of magnets 42 in the counters. It will be seen that the cards designated 662 and 723 will not be accumulated since the contacts 92a will remain open during the time said cards are passing the lower brushes.

It will be noted that during the passage of the cards designated 1101 through the machine, the holes representing the major group number will correspond on the first four cards; consequently, during each card cycle of this group circuits through the upper four magnets 79 will be established as follows: When the brushes read the holes in two successive cards designated 1101, circuits will be established from the line wire 16, cam contacts T—S, the upper brushes UB, cable 29, to the plug sockets 30 associated with the four columns in which the major group number appears, through the plug wires to the upper four sockets 80, the contacts 79a and magnets 79, plug sockets 78 and the plug wires to the plug sockets 35, cable 34, the lower brushes, and the common wire to cam contacts T—2, T—3 or T—4, T—5, back to the line wire 17, through the contacts LCL, T—1, and P—3.

Since the group number is the same on both cards, the upper four magnets 79 will all be energized and close their associated contacts 79b;

consequently, when the cam contacts C—1 open toward the end of each cycle, the circuit through the motor control relay MCC will still be maintained and will extend through the upper four contacts 79b in series, the plug wire 90 and wires 87, 88. If it should happen, however, that successive major group numbers disagree as in the case of the fourth and fifth cards in the above example, at least one of the four magnets 79 will not be energized; consequently, one of the associated contacts 79b will remain open so that the opening of the cam contacts C—1 will interrupt the circuit through the motor control relay MCC and the holding relay 20 thereby causing the tabulating motor to stop at the end of the last cycle of the group being tabulated. As a consequence of the interruption in the circuit to the motor TM resulting in deenergization of the clutch magnet 13, the contacts 15 will close. Shortly thereafter and shortly before the tabulating motor comes to a stop, and prior to actual stopping of the tabulating mechanism, the cam contacts L—1 will close thereby causing the resetting motor RM to start automatically, as previously described, to effect a total taking and resetting operation near the end of which the motor control relay MCC and the holding relay 20 will be again set up due to closure of lower cam contacts P—3. Thus the total of the cards designated 651 appearing in the first major group designated 1101 will be printed on the record sheet adjacent the major and minor group designations.

The cards designated 651 of all the major groups will be similarly accumulated and the total of each group printed automatically as a consequence of the changes in the group numbers. It will be noted that there is a change in group number between the major groups designated 1102, 1103, 1104, which last two groups do not contain any cards designated 651. The change in the group number between said group numbers will cause the machine to automatically take a total. However, since no card designated 651 occurs in said groups designated 1103 and 1104, this operation will merely cause the printing of an asterisk upon the record sheet in a well known manner which asterisk signifies that counter No. 1 was clear after the passage of the preceding group.

After all of the cards have been tabulated, the totals and group numbers will appear on the record sheet substantially as in the following example and when the last card is fed from the machine the latter will come to a stop as a consequence of the opening of the lower card lever contacts LCL.

*Example II—Tabulating*

| | Printing Bank No. 1 | | Counter No. 1 | Counter No. 2 |
|---|---|---|---|---|
| 1 | 1101 | 651 | 198.07* | |
| 2 | 1102 | 651 | 1176.87* | |
| 3 | 1103 | 681 | * | |
| 4 | 1104 | 706 | * | |
| 5 | 1105 | 651 | 3000.41* | |
| 6 | 1106 | 651 | 138.00* | |
| 7 | 1108 | 667 | * | |
| 8 | 1109 | 650 | * | |
| 9 | | | | $4513.35 |

The grand total now may be printed from counter No. 2 by first engaging its clutch 54 so as to close the contacts 53 in said accumulator section. The key RS is then depressed to initiate a resetting and total taking cycle which results in the printing of the grand total of all the items designated 651. The accumulator wheels of section No. 2 will be cleared as a consequence of this last resetting and total taking operation and the machine will be in readiness for further tabulating operations.

During tabulating or non-listing operation of the machine the commutators 32 and 36 are latched up and remain stationary after the first card cycle of a group to prevent further listing of group numbers. Since two cycles are required to advance the first card into position to be sensed by the lower brushes, one to close the upper card lever contacts UCL and one to close the lower card lever contacts LCL, it is necessary to initiate a total taking cycle in order to unlatch said commutators after the first card has been moved to a position just above the lower brushes LB in readiness for the first entry in the accumulating mechanism if there is to be one. This total taking cycle takes place automatically after the first card has been fed to a position with its leading edge just under the lower brushes as described before herein and in greater detail in Patent No. 1,762,145.

The machine operates in substantially the same manner while listing, the only difference being that the lever LNL is thrown to the listing position and, instead of the commutator 32 being latched up after the first card has been tabulated, said commutator will remain in operation and will make one revolution for each card cycle. When listing is desired the switch 46 of counter No. 1 must be closed in order to permit the printing of the items on each card. After the listing operation performed on the cards in example No. I above has been completed, a record sheet will be secured which is substantially as follows:

*Example III—Listing*

| | Printing Bank No. 1 | | Counter No. 1 | Counter No. 2 |
|---|---|---|---|---|
| 1 | 1101 | 651 | 97.65 | |
| 2 | 1101 | 651 | 100.42 | |
| 3 | 1101 | 662 | | |
| 4 | 1101 | 723 | | |
| 5 | | | 198.07* | |
| 6 | 1102 | 651 | 98.43 | |
| 7 | 1102 | 651 | 75.46 | |
| 8 | 1102 | 651 | 1002.98 | |
| 9 | 1102 | 680 | | |
| 10 | | | 1176.87* | |
| 11 | 1103 | 681 | | |
| 12 | | | * | |
| 13 | 1104 | 706 | | |
| 14 | | | * | |
| 15 | 1105 | 651 | 3000.41 | |
| 16 | | | 3000.41* | |
| 17 | 1106 | 651 | 40.50 | |
| 18 | 1106 | 651 | 97.50 | |
| 19 | | | 138.00* | |
| 20 | 1108 | 667 | | |
| 21 | | | * | |
| 22 | 1109 | 650 | | |
| 23 | | | * | |
| 24 | | | * | $4513.35* |

It will be noted that, during listing operation, the record sheet will be spaced one line for each card and the group numbers of all cards will be printed, although the items corresponding to said group numbers will not be entered or printed in all cases, due to the fact that contacts 92a are open while all except cards designated 651 are passing the lower brushes.

Figure 5C:
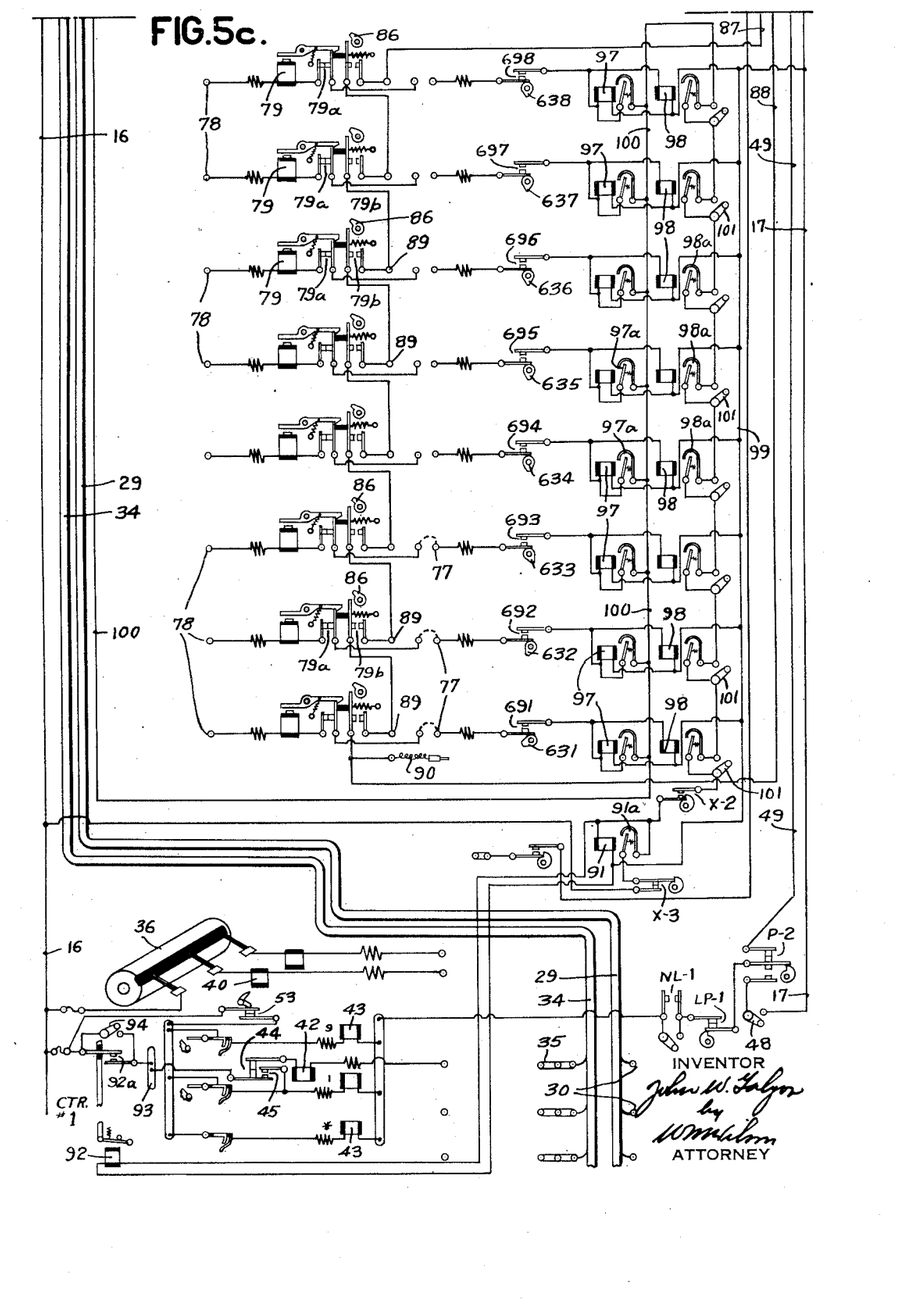
Fig. 5c together with Fig. 5a forms a circuit diagram of another form which the invention may take.

There is illustrated in Fig. 5c a modified form of automatic group control unit embodying the present invention wherein the series selector contacts 79c have been omitted and each pair replaced by a pair of relays. The general principle of operation of this modified form of automatic control unit is exactly the same as the one previously described except that the cooperation of magnets 79 and the cam contacts 691 to 693 sets up certain relays which in turn become operative to establish holding circuits for other relays whose contacts are in series in exactly the same fashion as the contacts 79c in the form of the invention illustrated in Fig. 5b. Since the operation is substantially the same only the arrangement of relays will be described in detail.

Referring to Fig. 5c, it will be seen that the automatic group control unit comprises a series of eight automatic group control circuits which in general are identical in construction and arrangement to the automatic group control circuits illustrated in Fig. 5b with the exception that each magnet 79 is provided with contacts 79a and 79b only, similar to those illustrated in Fig. 5b, the contacts 79b being the automatic group control contacts which function to initiate total taking and resetting cycles at the end of each group and operate exactly as described hereinbefore. The contacts 691 to 698, inclusive, are connected to plugs 77 exactly as before and to the windings of relay magnets 97, 98 respectively, which windings are also connected to the line 17 through a common wire 99 so that each pair of relays 97, 98 is connected in series parallel relation with the associated cam contacts 691 to 698, inclusive, and the common wire 99.

The points 97a of the relay magnets 97 are connected to the corresponding contacts 691 to 698 and also to a wire 100 which is connected to a point between the cam contacts T—S and the common bar holding the upper brushes UB.

The points 98a of the relay magnets 98 are connected in series to the wire 100 and the contacts X—2 which function exactly as described before in connection with the form of invention illustrated in Fig. 5b. Switches 101 are provided by means of which the contacts 98a may be shunted individually, switches 101 collectively being the equivalent of the plug wire 96 (Fig. 5b). The relay magnets 91 and 92 are connected in parallel between the common wire 99 and the cam contacts X—2, while the contacts 91a, and 92a of the relays 91 and 92 are connected as in Fig. 5c.

The machine when functioning with a control unit like that shown in Fig. 5c is plugged in substantially the same manner as the form shown in Fig. 5b, with the exception that the plug wires from plug sockets 30, corresponding to those upper brushes which read the minor group number are plugged to sockets 77 instead of to the plug sockets 78. The latter are not used except in the case of the upper four which in the present case are plugged for automatic group control exactly as before. When the upper brushes read the holes designating the group number 651 on the cards, the cam contacts 691 to 693 close to correspond with said holes with the consequence that in every case where a card bears the minor group number 651 the lower three pairs of relays 97 and 98 will be energized thereby causing their associated contacts 97a, 98a to close. The closure of the contacts 97a sets up a holding circuit for the relays 98 which holding circuit extends from the left line wire 16, the cam contacts T—S closed throughout most of the cycle, wire 100, contacts 97a, the windings of relays 97 and 98, and wire 99, to the right line wire 17. It will be understood that the switches 101 for the upper five pairs of relays 97, 98 have been closed, while the remainder are left in open position.

At the end of the adding part of the first cycle, that is, after the brushes have read all of the index point-positions concerned with the adding operation, cam contacts X—2 close. Due to the closure of all the contacts 98a, of the lower three relays 98, closure of the cam contacts X—2 will set up a circuit through the relays 91, 92, which circuit will extend from the wire 16, contacts T—S, and wire 100, through the switches 101 and contacts 98a, cam contacts X—2, the windings of relays 91, 92, and wire 99, to the right line wire 17. Shortly after the contacts X—2 close the cam contacts X—3 also close, thereby establishing a holding circuit for the relays 91 and 92 which holding circuit is held as before through the adding part of the following cycle.

Toward the end of the cycle in which the first card is read by the upper brushes the cam contacts T—5 will open, thereby breaking down the holding circuit for the relays 97, 98 in readiness for the analysis of the minor group numbers on the second card.

There are a number of important features of the invention worthy of note herein. One is the fact that it is not limited to control for enabling the entry of only cards bearing a certain classification or group number but also can be adapted to suppressing the entry of cards bearing a certain classification number and enabling the entry of the others. This result is secured by changing the contacts 92a of relay 92 to operate circuit opening instead of circuit closing. This arrangement is illustrated by the contacts 92b in Fig. 5d and the operation is the same with the difference that the items on the cards designated 651 will not be accumulated while all others will be accumulated.

Another feature of importance is the arrangement of switches 94, which permits the machine to be selectively set up to give various results. The foregoing statement can be aptly illustrated by assuming that with the following exceptions the machine has been set up as previously described in connection with the form of invention illustrated in Fig. 5b. It will be assumed that three counters (Nos. I, II, and III) are to be used and it is desired to secure a grand total of all sales of a given product such as the product identified by the minor group number 651 in the illustrative batch of cards, as well as sub-totals of such cards occurring in each major group which last named sub totals are to appear adjacent the other to secure sub-total of all cards in such groups irrespective of their classification for the purpose of securing a comparison between total sales in each group and the items designated 651 in order to determine their relative popularity or saleability.

Counters Nos. I and II will be clutched to the resetting shaft 55 as described to close the contacts 53 associated to counters Nos. I and II, while counter No. III will not be clutched to the resetting shaft and will be used to accumulate grand totals of all items designated 651. All three counters will be plugged to the sockets 35 corresponding to the lower brushes which read the items on the cards and switches 94 associated with counters Nos. II and III will be opened, whereas switch 94 for counter No. I will remain closed. The machine will otherwise be plugged exactly as before, the lower three circuits of the group control unit functioning on a minor group number, while the upper four function on the major group numbers.

In passing through the machine all of the cards will be accumulated on counter No. I, whereas only those cards designated 651 will be accumulated on counters Nos. II and III and sub-totals will be printed on the occurrence of a change in major group number. One of the sub-totals will indicate the total of the items in each major group while alongside of it, on the same line, will be printed a second sub-total indicating the total number of items designated 651 occurring in that group. When the operation is complete a total taking cycle may be initiated and counter No. III may be reset under manual control to exhibit on the record sheet the grand total of all items designated 651. Thus, a record sheet will be secured which shows after each major group number sub-totals of all cards in the group alongside of sub-totals of only certain cards of that group. By computing the percentage relation between each pair of sub-totals the saleability or popularity of a specified product with respect to the other products may be readily determined.

Figure 5D:
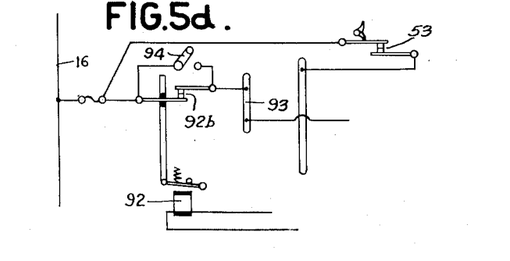
Fig. 5d is a diagram illustrating another modification.

Conversely, if the modification illustrated in 5d is used, the reverse will be true, that is, counter No. I will accumulate all items, whereas counter Nos. II and III will accumulate all items except those designated with the group number 651. Various other set-ups of switches 94 may be had to secure various results, such set-ups controlling the elimination of specified cards or, conversely, the accumulation of only specified cards on certain counters.

It will be clearly seen from the foregoing descriptions of the various forms which the invention may take that it is very flexible in its adaptability to practical problems. Consequently, it is not desired to be limited to any precise form of the invention.

It will be obvious, of course, that by suitably positioning the plug wires 90, 96 the machine may be set-up to prevent accumulation or permit accumulation, as the case may be, of cards bearing group numbers of more than one digit up to the full capacity of eight digits permitted by the eight wheels 64 of the selector device. If desired, of course, the number of wheels may be increased to handle group numbers of as many digits as desired. The number of automatic group control circuits may be increased, of course, to avoid unnecessarily limiting the capacity of the automatic group control mechanism to compare group numbers on successive cards.

The present invention, solely for purposes of illustration and to explain the principles upon which the invention is based, has been described and illustrated in several specific forms and as applied to a particular type of machine. However, it will be obvious that the invention is limited neither to the specific forms shown, nor to the particular type of machine illustrated, but is capable of being varied to adapt it to different machines and to different problems encountered in practice.

What is claimed is:—

1. A record controlled machine comprising group control mechanism including a plurality of relays adapted to be set up when group designations in successively presented pairs of records agree, manually settable means for rendering the group control relays effective for predetermined group designations only, accumulating mechanism adapted to accumulate items under control of the records, means controlled through the settable means and the group control means for permitting entry in the accumulating mechanism of items from records having group designations corresponding to the setting of the manually settable means, means for taking a total from the accumulating mechanism, and means controlled by the group control mechanism for causing the total taking mechanism to take a subtotal of only the items entered in the accumulating mechanism and corresponding to the predetermined designations.

2. In a record controlled machine, means for reading together data designations on two successively presented records, a series of group control elements connected to the reading means, a series of manually settable comparing devices each corresponding to one of said elements and adapted to be connected thereto for rendering the group control elements effective to respond to predetermined group designations only, accumulating mechanism and total taking mechanism therefor, means controlled by the group control elements for causing items identified by only predetermined group designations to be entered in the accumulating mechanism, means also controlled by the group control elements for initiating an operation of the total taking mechanism to take a total from the accumulating mechanism of the items identified by predetermined group designations, and means for arbitrarily splitting the series of control elements into two separate groups, one of which controls the total taking mechanism and the other controls the second named means.

3. In a record controlled machine, card reading elements for sensing together corresponding data designations in two successively presented records, a series of group control relays connected to said elements, manually settable selector elements each corresponding to one of said relays and adapted to be connected thereto to render several of said relays effective for predetermined data designations, accumulating mechanism, adapted to receive entries from the cards under control of item designations therein, a series circuit directly controlled by said relays for effecting a given machine operation with respect to the accumulating mechanism when successive cards sensed by the reading elements disagree as to the data designations sensed, a second series circuit directly controlled by said relays for causing a different machine operation with respect to the accumulating mechanism when data designations sensed by the reading elements disagree with the setting of the selector elements, and means for at will splitting the group control relays into two groups whereby to render one group effective to control the first series circuit only and the other group effective to control the second series circuit only.

4. A record controlled machine having means for reading group designations in successively presented records; selector mechanism cooperating with the reading means to sense the presence of a record identified by a predetermined combination of group designations, said selector mechanism comprising a shaft driven in synchronism with the reading of the group designations and a plurality of cams mounted on said shaft and manually displaceable on said shaft in accordance with the predetermined combination of designations; accumulating mechanism adapted to receive entries under control of data designations identified by said group designations, and means controlled by the cams for determining whether or not an item identified by the predetermined designations is to be accumulated.

JOHN W. GALYON.